H. L. WATSON.
THERMOSTATIC REGULATOR FOR INCUBATORS.
APPLICATION FILED JAN. 31, 1918.

1,304,635.  Patented May 27, 1919.

INVENTOR
Harold L. Watson.

WITNESS

BY

ATTORNEYS

UNITED STATES PATENT OFFICE.

HAROLD L. WATSON, OF LANCASTER, PENNSYLVANIA.

THERMOSTATIC REGULATOR FOR INCUBATORS.

1,304,635.  Specification of Letters Patent.  Patented May 27, 1919.

Application filed January 31, 1918. Serial No. 214,635.

*To all whom it may concern:*

Be it known that I, HAROLD L. WATSON, a citizen of the United States, and a resident of Lancaster, in the county of Lancaster, State of Pennsylvania, have invented certain new and useful Improvements in Thermostatic Regulators for Incubators, of which the following is a specification, reference being had to the accompanying drawing.

This invention relates to a novel type of thermostat together with the associated means operated thereby to regulate the temperature in an incubator—as by controlling an opening provided for the purpose of permitting the air to escape from or enter the incubator. An object of this invention, therefore, is to provide a simple form of thermostat so constructed as to facilitate its manufacture and arrange to provide a very sensitive device whose operation depends upon the use of certain elements having different coefficients of expansion so associated as to cause a relative movement between said members upon an increase or decrease of the temperature in an incubator and thereby operate to control a damper for the opening referred to.

Further objects of this invention are to provide a structure of the character indicated in which the more expansible element of the thermostat is made of relatively thin material and provided with stiffening flanges, the flanges being so arranged that the several elements of the thermostat may be readily secured together, and moreover, a particularly sensitive and positively operating device is provided. Further objects of this invention include the manner in which the members referred to are assembled or operatively positioned within the thermostat, certain details of construction, and association of means as will hereinafter more fully appear.

Figure 1:
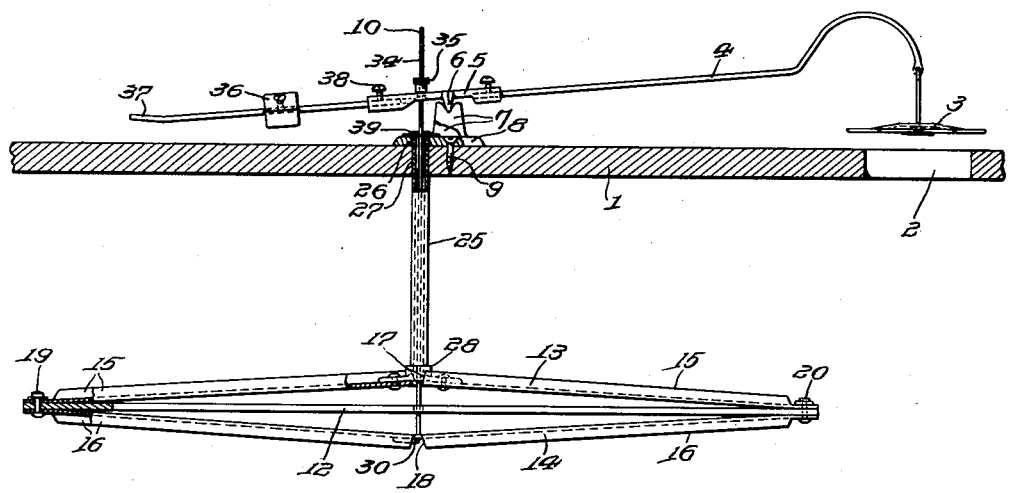
Figure 2:
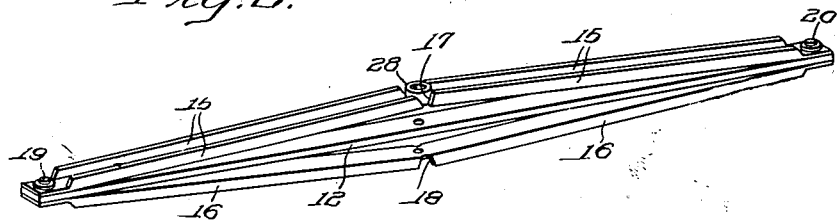

Referring to the accompanying drawing, Figure 1 is a side elevation with parts in section showing my thermostatic regulator applied to an incubator, while Fig. 2 is a perspective view of the thermostat *per se.*

The top wall 1 of the incubator is shown as provided with an opening 2 which may be the opening through which the air from the incubator is permitted to escape, or the opening 2 may represent an air inlet, if desired. The damper 3 is adapted to be regulated in accordance with the temperature within the incubator and controls the opening 2. This damper 3 may be loosely hung from an arm 4 adjustably carried by the rocking plate 5 which is provided with knife edge bearings 6, the bearings 6 being supported on suitable standards 7 projecting upwardly from a casting 8. The casting 8 may be suitably positioned on the wall 1 as by means of the screw 9, although, of course, any means may be employed for properly positioning the casting 8 in place.

The plate 5 is adapted to be rocked on its bearings 6 by a rod 10 which is controlled by a thermostat constructed to attain the objects above set forth and shown in perspective in Fig. 2. The thermostat which I have provided includes a central member 12 which may be of a relatively non-expansible material and a plurality of bowed members 13 and 14 arranged on opposite sides thereof. The members 13 and 14 have a higher coefficient of expansion than the member 12 and may be made of a relatively thin material provided with stiffening flanges 15 and 16. These flanges are cut away as at 17 and 18 adjacent the central portion of the members 13 and 14 and each of the flanges on each of the members 13 and 14 are further cut away at the extremities of these members so that the central member 12 and each of the members 13 and 14 may be rigidly secured at their ends by means of rivets 19 and 20, for example. By cutting away the flanges at the ends of the members 13 and 14, the same may be more readily joined to the member 12 and the operation of the thermostat is enhanced by reason of the fact that a rigid connection between the member 12 and the relatively expansible members is provided.

One means for positioning the thermostat within the incubator in such a manner as to efficiently operate the rod 10 and hence control the arm 4 and damper 3, is by means of a tube 25 which may be secured to the casting 8 as by being threaded therein at 26. The tube 25, of course, passes through an opening 27 in the top wall 1 and is secured in a bushing 28 carried by the member 13. The bushing 28 may be riveted to this member as shown at 29 in Fig. 1. The rod 10 is located within the tube 25 and passes through the member 13 and through the member 12, being secured to the member 14 in any manner as by passing through an opening 30 therein and bent over and secured to this member by the bent over portion. The rod 10 passes loosely through the members 12 and 13 for a purpose that will hereinafter appear, and is provided with screw threads 34 adjacent its upper end whereby the rod may be adjustably positioned relative to the rocking plate 5 by means of the thumb nut 35. The rocking plate 5 may be provided with a counterweight 36 adjustably secured on the rod 37 which, in turn, is secured on the plate 5 by the set screw 38. A washer 39 may surround the rod 10, if desired, and rest on the casting 8 above the open end of the tube 25.

The operation of the mechanism will be readily understood from the foregoing wherein it will be seen that upon an expansion of the members 13 and 14 to a greater amount than that of the member 12, due to an increase in the temperature within the incubator, the member 14 will move downwardly carrying with it the rod 10 which rocks the plate 5 about its pivot 6 and causes the arm 4 to open the damper 3. A lowering of the temperature within the incubator causes the members 13 and 14 to approach each other at their central portions and thus operate to raise the rod 10 and thereby cause the damper 3 to close the opening 2. The cutaway portions 17 and 18 of the flanges 15 and 16 adjacent the central bowed portions of the members 13 and 14 facilitate the expansion and contraction of these members relative to each other and thus act to further insure the positive operation of the device. The manner in which the channel-shaped members 13 and 14 are disposed relative to the member 12 with the flanges 15 and 16 extending in opposite directions therefrom, permits the use of relatively long members which gradually taper together at their extremities avoiding the possibility of the flanges 15 and 16 contacting with the member 12 and permitting the backs of the members 13 and 14 to be securely riveted at 19 and 20 to the member 12, the flanges 15 and 16 being cut away at this portion to facilitate the manufacture of the thermostats and insure a rigid connection at this point.

Having thus described my invention, I claim and desire to protect by Letters Patent of the United States:

1. In a thermostat, the combination of a relatively non-expansible member and a plurality of relatively expansible channel-shaped members located on opposite sides thereof, said channel-shaped members having the flanges thereof extending in opposite directions and cut away adjacent the middle portion of said members and at each end thereof and means for securing said first-mentioned member and said channel-shaped members together at the ends thereof where the flanges on the channel-shaped members are cut away.

2. In a thermostat, the combination of a relatively non-expansible member, a plurality of channel-shaped members on opposite sides thereof with the flanges of the channel-shaped members extending away from said non-expansible member and cut away at the central portion of said members and adjacent either extremity thereof and means for securing said channel-shaped members and said non-expansible member together at said extremities.

3. In a thermostat, the combination of a relatively non-expansible member, a plurality of bowed expansible channel-shaped members on opposite sides thereof, the flanges of said channel-shaped members extending in opposite directions and away from said non-expansible member, said flanges being cut away at the central portion of said members and adjacent either extremity thereof and means for securing said channel-shaped members and said non-expansible member together at said extremities.

4. In a thermostat, the combination of a relatively non-expansible member, a plurality of bowed expansible channel-shaped members on opposite sides thereof, the flanges of said channel-shaped members extending away from said non-expansible member, said flanges being cut away at the central portion of said members and means for securing said channel-shaped members and said non-expansible member together at their extremities.

In witness whereof, I have hereunto set my hand this 30th day of January, A. D., 1918.

HAROLD L. WATSON.